United States Patent

[11] 3,563,574

[72] Inventors Joseph C. Jackson
 Ambler, Pa.;
 Joseph C. Giuffre, McPherson, Kans.
[21] Appl. No. 794,646
[22] Filed Jan. 28, 1969
[45] Patented Feb. 16, 1971
[73] Assignee Certain-teed Products Corporation
 Ardmore, Pa.

[54] COUPLING FOR PLASTIC PIPE
 5 Claims, 2 Drawing Figs.
[52] U.S. Cl. .................................................. 285/187,
 285/235, 285/334.4, 285/423
[51] Int. Cl. .................................................. F16l 27/10,
 F16l 47/00
[50] Field of Search.......................................... 285/110,
 111, 109, 235, 236, 334.4, 369, 423, 187, 304

[56] References Cited
 UNITED STATES PATENTS
2,808,275  10/1957  Sherman ................. 285/110X
2,146,641  2/1939   McWane ................. 285/369X
2,686,685  8/1954   Shoemaker ............ 285/334.4X
2,871,031  1/1959   Altemus et al. ........ 285/230X
3,204,988  9/1965   Ouderkirk et al. ..... 285/423X
3,216,747  11/1965  Green ..................... 285/334.4X
3,315,970  4/1967   Holloway ............... 285/111X
3,362,731  1/1968   Gasche et al. ......... 285/334.4X FOREIGN PATENTS
  124,087  5/1947   Australia ................ 285/187
1,234,231  5/1960   France ................... 285/110
  940,833  11/1963  Great Britain ......... 285/110

Primary Examiner—Thomas F. Callaghan
Attorney—Synnestvedt & Lechner

ABSTRACT: A coupling or joint for use in interconnecting adjacent ends of sections of pipe made of plastic material, comprising a coupling sleeve with sockets to receive the ends of adjacent pipe sections, sealing rings between the pipe ends and the inside of the sockets, and mechanism for limiting assembly movement of the pipe ends into the sockets comprising annular abutments having inclined abutment faces spaced from each other, the inclined abutment faces being configured and proportioned in relation to the ends of the pipes to accommodate thermal expansion of the pipes.

PATENTED FEB 16 1971
3,563,574
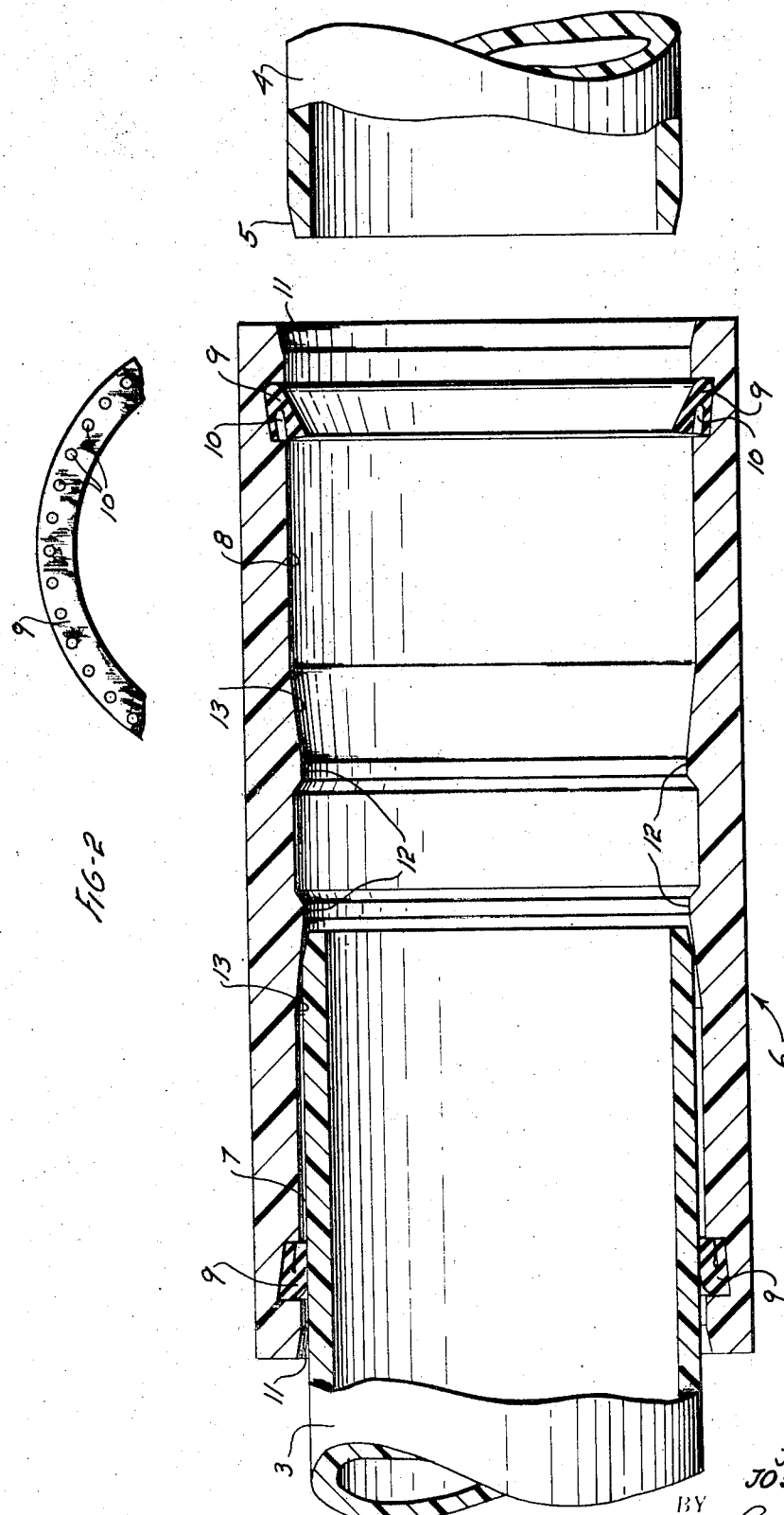
INVENTOR.
JOSEPH C. GIUFFRE
JOSEPH C. JACKSON
BY
Synnestvedt & Lechner
ATTORNEYS

COUPLING FOR PLASTIC PIPE

This invention relates to a pipe coupling or joint especially adapted for the interconnection of the ends of adjacent sections of plastic pipe.

Plastic pipe of various kinds is being quite widely employed for many purposes. Such pipe is formed from several different plastics, such as acryonitrile butadiene styrene and various forms of polyvinyl chloride, including particularly the so-called semirigid and rigid types of polyvinyl chloride. As the polyvinyl chloride types of pipe are perhaps the most common, the present invention will be described hereinafter with particular reference to polyvinyl chloride pipe.

Several systems for coupling or interconnecting sections of polyvinyl chloride pipe have been employed, including the solvent weld method, and the gasketed bell method.

In the gasketed bell system, one end of each length of the pipe is provided with a bell or socket and the other end constitutes a spigot. In this form of coupling a sealing or packing ring is inserted in a groove in the socket and the spigot of one pipe section is placed in the socket of an adjoining section. This system is subject to a number of disadvantages, one of which is the fact that the provision of a socket at one end of each pipe section requires a special fabrication operation to form the socket. In most instances, the socket is formed by shaping an end portion of the pipe itself, but in other instances the socket is formed as a separate piece and then welded to the pipe, which latter system involves a still further operation, namely the welding. In addition, the handling, storage and shipment of pipe sections having an enlargement or socket at one end is awkward, because such pipe sections do not stack conveniently or economically from the standpoint of the space occupied.

Another disadvantage lies in the fact that if the spigot end of one pipe section is inserted into the socket of the adjoining pipe section to the limit of the motion provided, subsequent thermal expansion of the pipe is likely to buckle the pipe, because no freedom or leeway is provided for accommodating pipe expansion. This is a matter of serious concern for the reason that the plastic pipe has a relatively high coefficient of expansion, especially when compared with metallic pipes such as iron or steel. Indeed polyvinyl chloride pipe will expand about six times as much as steel, so that in a forty foot length of plastic pipe, a 50° rise in temperature would result in about a one inch increase in the length of the pipe. Moreover, it is quite common for such temperature changes to occur. For example, after such plastic pipe has been laid in a trench, a liquid carried by the pipe may well cause very substantial rise in temperature, with consequent buckling of the pipe or damage to the pipe joints.

In accordance with another known system for coupling such plastic pipe, i.e., the solvent weld method, the joint was made by applying a solvent to either or both ends of the pipe, for instance to a spigot end received in a socket. It was then necessary to assure that this joint was held accurately in the position in which it was desired to have the welded joint set. This requires a considerable time and during that time the pipe laying must be interrupted and cannot be resumed until that joint will withstand the subsequent handling required in making the succeeding joint.

The solvent weld system is also subject to the same disadvantages as those referred to above in connection with the problem of accommodating expansion and contraction, for instance due to thermal changes.

In efforts to overcome the problems encountered as a result of thermal expansion and contraction, plastic pipe has sometimes been laid in an irregular path, this being referred to as "snaking" the pipe. This has been accomplished by randomly varying the position of the pipe horizontally off the centerline of the trench in which the pipe is being laid, to provide curved portions which would accommodate the expansion and contraction; but "snaking" of the pipe has distinct disadvantages, and, indeed, is impractical or uneconomical because of the requirement for a larger trench than actually needed and also because of the fact that with larger sizes of pipe, the pipe is relatively stiff and therefore is difficult to bend from the straight line.

Still further, solvent welded joints are of course permanent and thus eliminate the possibility of disassembly and reuse.

Having in mind the foregoing disadvantages of the gasketed socket and spigot type of joint and also of the welding method, certain other coupling systems have been tried including thermal welding and threaded interconnections, but these necessitate sophisticated equipment and a high degree of skill and are not suitable for wide use. Moreover, the problems of expansions and contraction still remain.

Having in mind the foregoing problems and difficulties encountered in the coupling of plastic pipe sections, the present invention has as its primary objective, the provision of a simple and effective pipe coupling utilizing a coupling sleeve having abutment means therein for the ends of the two adjacent pipe sections to be coupled, the abutment means being configured and proportioned in relation to the size of the pipe sections being coupled so as to perform two important functions—first, to limit the assembly motion of the ends of the pipe sections into the coupling sleeve during the operation of laying the pipe, and second, to provide for accommodation of thermal expansion and contraction without impairing the tightness of the joints or seals.

It is also an object of the invention to provide a coupling system which is exceedingly simple to properly use in the field while at the same time reliably serving to accomplish the two important functions above referred to.

How the foregoing objects and advantages are attained, together with others which will occur to those skilled in the art will appear more fully from the following description referring to the accompanying drawings, in which:

FIG. 1 is a longitudinal sectional view through a coupling sleeve according to the present invention, this view illustrating the end portion of one of the pipe sections being coupled inserted into the socket at one end of the coupling sleeve and further illustrating the end portion of the other pipe section to be coupled positioned just outside of the opposite end of the sleeve in preparation for insertion in the socket at that end; and FIG. 2 is a fragmentary elevational view of a portion of a sealing ring or gasket preferably employed in the coupling system of the present invention.

According to the present invention, instead of employing a bell or socket at one end of the pipe sections to be connected, the pipe sections merely comprising appropriate lengths, for instance of about forty feet, of the plastic pipe in the form in which it is extruded. The end portions of two such pipe sections are indicated in the drawing by the reference numerals 3 and 4.

Preferably an external chamfer or bevel 5 is provided at each end of each pipe section for a purpose to be explained hereinafter. The pipe sections thus are substantially constant in shape from end to end and may be therefore be readily handled, stored and shipped.

For each joint, a coupling sleeve generally indicated at 6 is provided. Each end of this sleeve comprises a socket, as indicated at 7 and 8, adapted to receive the adjacent ends of the pipe sections to be coupled. As will be seen, the inside diameter of these sockets is somewhat greater than the outside diameter of the pipes being coupled. In the assembly here being described, it is assumed that the plastic pipe is 3½ inches in outside diameter. With a pipe of that diameter, the inside of the socket should be about 3.54 inches in diameter.

Near the mouth of each socket, the sleeve is provided with a groove for receiving a gasket or sealing ring such as indicated at 9. This ring may take a variety of forms, but one appropriate ring substantially conforms with the ring disclosed in the Altemus et al. U.S. Pat. No. 2,871,031 issued Jan. 27, 1959. The ring, in general, comprises an annulus having a somewhat wedge-shaped cross section and is preferably provided with a series of recesses 10 which accommodate flow or distortion of material of the ring when the pipe end is inserted into the joint, as will readily be understood from examination of the left-hand end of the joint shown in FIG. 2, at which end the pipe 3 has already been inserted and the ring 9 compressed.

The ring is desirably formed of an elastomeric material, such as natural or synthetic rubber, as is common for rings of this general type. One preferred rubber for this purpose is the styrene butadiene type of rubber which has good chemical resistance with reference to most common types of liquids transmitted through plastic pipes. Polyvinyl chloride pipe, however, has chemical resistance with respect to even a wider range of liquids than does the styrene butadiene rubber, for instance resistance to adverse influence of oil. The joint of the present invention, however, is not limited to any particular elastomeric material for the sealing rings and, for example, where oil resistance is desired, the rings may be formed of nitrile butadiene rubber.

The mouth of each socket of the coupling sleeve is provided with an internal bevel 11 to facilitate insertion of the pipe end, this purpose also being served by the external bevel 5 on the pipe itself.

At a point spaced well inwardly from the sealing ring 9, each socket is provided with an annular abutment 12 having an inclined abutment face 13 which progressively decreases in diameter from the diameter of the main portion of the socket (which is larger than the outside diameter of the pipe) to a diameter which is smaller than the outside diameter of the pipe, as will readily be noted at the left hand end of the joint shown in FIG. 1, where the pipe end 3 has been inserted to the point where the outside of the pipe engages the inclined surface 13 of the abutment 12. It will further be observed that the two abutment faces 13 at the inner ends of the two sockets in the sleeve are spaced from each other an appreciable distance, this being for a purpose referred to below.

The inclined abutment faces 13 serve as interference stops limiting the normal assembly motion of the pipe ends into the sockets at the ends of the sleeve. In the preferred embodiment, the angle of inclination of the abutment faces 13 with reference to the axis of the joint is smaller than the angle of the external bevel at the ends of the pipe sections with reference to the axis of the joints.

In a typical example, where the pipe is formed of rigid polyvinyl chloride, the sleeve is also formed of the same or a similar resin material, preferably having a coefficient of thermal expansion substantially the same as that of the pipe. Moreover, in such a typical example, and with a bevel angle at the ends of the pipe sections of the order of 8° from the axis of the joint, and with an inclined abutment face angle of the order of 5°, the action of the abutments in interfering with the assembly motion of the pipe ends into the sleeve, will provide a resistance to the assembly motion of a magnitude preventing manual insertion of the pipe ends substantially beyond the point of engagement of the pipe ends with the inclined abutment faces, under normal conditions in the field. In other words, with the arrangement as described above, the workman assembling the pipe joints or couplings will encounter resistance to assembly motion establishing a definite limit to the assembly motion insofar as the normal manual handling of the pipe sections and sleeve is concerned. Numerically, in the example here being considered, this resistance is such that to force a pipe end into its socket beyond the desired point (as illustrated at the left of FIG. 1) would require a force of at least 200 pounds.

The inclined abutment faces, therefore, will clearly indicate to the personnel effecting the assembly when the desired extent of assembly has been reached. At the same time, however, the configuration and proportioning of the inclined abutment faces in relation to the ends of the pipe will permit the end of the pipe to enter the socket beyond the point indicated at the left of FIG. 1 by virtue of some compression of the end of the pipe and limited stretching of the sleeve. In view of this, a joint, for instance a joint which has been buried in a ditch, will accommodate appreciable expansion of the pipe as a result of increase in temperature. Indeed, with the abutment faces spaced from each other some appreciable distance as is indicated in FIG. 1, the coupling will actually accommodate expansion of the order of one inch for forty foot pipe lengths, without resulting in damage to the joints or buckling of the pipe.

In a preferred embodiment the thickness of the sleeve wall is preferably sufficient so that even when grooved to accommodate the sealing rings, the wall thickness remaining will still be at least of the order of the thickness of the wall of the pipe itself, thereby assuring that the sleeve will have a bursting strength at least as high as that of the pipe.

By forming the coupling sleeve of plastic material, preferably of plastic material similar to that of the pipe sections to be connected, the joint exhibits the unique ability for the pipe ends to deform and pass over the inclined abutments or stops, which is a characteristic not possessed by metallic joint arrangements.

The joint of the present invention is also of advantage in that is may be disassembled and reused.

In the assembly of a joint according to the present invention the pipe ends or the sealing gasket, or both, are desirably lubricated in order to avoid displacement of or damage to the sealing gaskets.

The inclined abutment faces are also of advantage as an aid to centering the pipe ends in the coupling sleeve, thereby avoiding unnecessary parallel misalignment having a tendency to excessively compress the packing ring at one side of the joint. The joint remains tightly sealed, notwithstanding normal angular and parallel misalignment and notwithstanding even repeated expansion and contraction of the pipe sections, with consequent motion of the pipe ends into and out of the coupling sleeve.

Because of the preferred use of the same resin material for the coupling sleeve as the resin material of which the pipe sections are formed, the joint maintains the same chemical, physical, and functional properties that the connecting pipes possess, and in addition the clearances and tolerances will remain substantially the same regardless of thermal changes and the consequent expansion of both the pipe ends and the coupling sleeve.

Because of the elimination of solvent welding or the like, there is no waiting period between the making of one joint and the dropping of that portion of pipeline into a trench, and the making of succeeding joints need not be delayed.

The coupling sleeve may be formed in a variety of ways, as by molding or machining, or combinations of these techniques. In accordance with the preferred technique, the coupling sleeve may be cut from extruded tubular stock, after which the ring grooves and abutment surfaces may be machined into the stock.

We claim:

1. A coupling for use with pipe formed of resin material, the coupling comprising adjacent pipe sections each having its end externally beveled, a coupling sleeve receiving the beveled ends of the adjacent pipe sections and having internal grooves for sealing rings, and sealing rings in said grooves cooperating with the pipe sections, the sleeve having abutments formed on the internal surface thereof for limiting assembly movement of the pipe sections into the sleeve, the abutments for the respective pipe sections comprising annular ridges in the sleeve and each having an annular inclined abutment face decreasing in diameter inwardly of the sleeve, the diameters of the ends of the adjoining pipe sections and of said inclined abutment faces providing for engagement of the beveled ends of the pipe sections with the inclined abutment faces intermediate the regions of maximum and minimum diameter of the inclined faces, the angle of inclination of the abutment faces providing freedom for advancement of the pipe ends into the sleeve with resultant compressive distortion of the end portions of the pipe sections when the pipe sections are forced into the sleeve under the influence of expansion of the coupled pipes, and the abutment ridges being spaced from each other to provide an intervening space therebetween of diameter greater than the minimum diameter of the ridges and thereby accommodate inward advancement of the pipe ends beyond said ridges.

2. A coupling as defined in claim 1 in which the bevel on the ends of the adjacent pipe sections lies at an angle to the axis of the joint larger than the angle of inclination of the abutment faces in the sleeve.

3. A coupling as defined in claim 1 in which the inside diameter of the sleeve in the region from the inclined abutment faces to the ends of the sleeve is greater than the maximum diameter of the inclined abutment faces.

4. A coupling as defined in claim 1 in which the sleeve is formed of resin material having a coefficient of thermal expansion substantially the same as that of the pipe sections.

5. A coupling for use with pipe formed of resin material, the coupling comprising a pipe section having its end externally beveled, a coupling socket receiving the beveled end of the pipe section and having an internal groove for a sealing ring, and a sealing ring in said groove cooperating with the pipe section, the socket having an abutment formed on the internal surface thereof for limiting assembly movement of the pipe section into the socket, said abutment comprising an annular ridge in the socket, said ridge having an annular inclined abutment face decreasing in diameter inwardly of the socket, the diameters of the end of the pipe section and of said inclined abutment face providing for engagement of the beveled end of the pipe section with the inclined abutment face intermediate the regions of maximum and minimum diameter of the inclined face, the angle of inclination of the abutment face providing freedom for advancement of the pipe end into the socket with resultant compressive distortion of the end portion of the pipe section when the pipe section is forced into the socket under the influence of expansion of the coupled pipe, said socket in the region inboard of said ridge having a diameter greater than the minimum diameter of the ridge and thereby accommodate inward advancement of the pipe end beyond said ridge.